United States Patent [19]

Eberhard et al.

[11] Patent Number: 4,751,391

[45] Date of Patent: Jun. 14, 1988

[54] HIGH RESOLUTION X-RAY COLLIMATOR/DETECTOR SYSTEM HAVING REDUCED SENSITIVITY TO LEAKAGE RADIATION

[75] Inventors: Jeffrey W. Eberhard; David W. Oliver, both of Schenectady, N.Y.

[73] Assignee: General Electric Company, Schenectady, N.Y.

[21] Appl. No.: 944,483

[22] Filed: Dec. 19, 1986

[51] Int. Cl.⁴ .................. G01T 1/185; H01J 47/02
[52] U.S. Cl. ........................... 250/385.1; 250/505.1
[58] Field of Search ............. 250/385 R, 374, 505.1; 378/147, 21, 22, 25

[56] References Cited

U.S. PATENT DOCUMENTS

| | | | |
|---|---|---|---|
| 3,385,988 | 5/1968 | Hyun | 250/385 R |
| 4,031,396 | 6/1977 | Whetten et al. | 250/385 R |
| 4,075,492 | 2/1978 | Boyd et al. | 250/385 R |
| 4,367,409 | 1/1983 | Klausz | 250/385 |
| 4,392,237 | 7/1983 | Houston | 250/385 R |
| 4,394,578 | 7/1983 | Houston et al. | 250/374 |
| 4,419,585 | 12/1983 | Strauss et al. | 250/505.1 |
| 4,420,689 | 12/1983 | Rogers et al. | 250/385 |
| 4,455,488 | 6/1984 | Conrad et al. | 250/385 R |
| 4,475,043 | 10/1984 | Houston | 250/385 |
| 4,535,245 | 8/1985 | Zonneveld et al. | 250/385 R |
| 4,581,536 | 4/1986 | Groppetti et al. | 250/385 |
| 4,638,499 | 1/1987 | Eberhard et al. | 250/385 R |

Primary Examiner—Janice A. Howell
Assistant Examiner—William F. Rauchholz
Attorney, Agent, or Firm—Donald R. Campbell; James C. Davis, Jr.; Paul R. Webb, II

[57] ABSTRACT

An ionization chamber X-ray detector which minimizes the effects of leakage X-rays in systems where a collimator is employed to define resolution. The active collection volume of each detector element is reduced to the actual volume occupied by the negative ion cloud resulting from an incident X-ray beam for optimum response to desired radiation while minimizing response to leakage radiation by a combination of reducing the width of the collector electrodes with wider spaces in between the collector electrodes, and providing metallized guard electrodes between the collector electrodes. The guard electrodes serve to collect electrons freed by ionization between the collector electrodes resulting from "noise" X-rays, preventing these particular electrons from building up a space charge, or from reaching the actual collector electrodes. In addition, electric field distortions are minimized, with a consequent avoidance of adverse effects on detector response characteristics.

10 Claims, 5 Drawing Sheets

HIGH RESOLUTION X-RAY COLLIMATOR/DETECTOR SYSTEM HAVING REDUCED SENSITIVITY TO LEAKAGE RADIATION

BACKGROUND OF THE INVENTION

The present invention relates to an X-ray detector which minimizes the effects of leakage X-rays in ionization chamber detector systems where collimation is used to define resolution.

Industrial X-ray Computerized Tomography (CT) systems are designed to provide images of the internal structure of manufactured parts. In order to effectively image small structures or defects, high resolution measurements are required. Industrial inspection applications generally require higher resolution and higher energy X-rays compared to medical applications. Inherent in a high resolution measurement is a small aperture, and resultant limited number of X-rays passing along the desired inspection path.

In systems where collimation is used to define resolution, ordinarily the collection volume of each detector element is significantly larger than the primary beam volume at the collector. Typically, the collection volume is from fifteen to fifty times the primary beam volume. As a practical matter, collimators do not serve their function perfectly. Thus, a typical collimator attenuation factor is fifty, and radiation, which becomes leakage radiation, passes through portions of the collimator other than the desired beam-defining apertures.

Leakage radiation, which may be viewed as "noise", is accordingly a serious problem. Although the leakage radiation is greatly attenuated, the total collection volume sensitive to leakage radiation results in a relatively poor signal-to-noise ratio. Leakage radiation must be limited to very small values in order to achieve adequate signal-to-noise ratios for effective measurements.

More particularly, a collimator/detector system of the general type with which the present invention is concerned is disclosed in commonly assigned application Ser. No. 875,021, filed , June 16, 1986, now U.S. Pat. No. 4,638,499 which is a continuation of Ser. No. 638,171, filed Aug. 6, 1984, now abandoned. As described in that application, a typical X-ray detector array for use in industrial CT systems is of the type described in Houston et al., U.S. Pat. No. 4,394,578, and includes, within an ionization chamber containing pressurized xenon gas, a high voltage plate at a fixed separation from a printed circuit detector board carrying a linear array of individual collector electrodes held generally at ground potential and connected to detector electronics. Incident X-rays enter between the high voltage plate and the detector board in a beam along an axis between and parallel to the voltage plate and detector board and ionized xenon atoms, producing positive and negative xenon. Assuming the voltage plate carries a negative charge, the positive ions are attracted to it. The negative ions are attracted to the collector electrodes, and transferred to a charge-to-voltage converter, which may be viewed as the first stage of a data acquisition system. The resulting voltage is digitized and transferred to a computer. A typical detector board contains a plurality of metallized collector electrode regions, separated by narrow insulating strips.

The resolution of the detector alone is determined, to first order, by the width of the collector electrodes. As described in application Ser. No. 875,021, now U.S. Pat. No. 4,638,499, such a detector, without more, does not provide satisfactory resolution. In order to achieve resolutions on the order of 10 mils and less, the beam width of the incident X-ray beam is appropriately limited by means of the collimator.

The present invention further improves such systems to minimize the effects of leakage radiation on the measured signal-to-noise ratio. The invention may be viewed as aiding the function of the collimator, making it more effective. The present invention also serves to reduce crosstalk between adjacent detector channels.

Although disclosed herein in the context of a limited angle industrial X-ray CT inspection system for providing high resolution images of long, thin metal objects, the invention is useful in any situation where collimation is used to define resolution, that is, where collection volume is larger than primary beam volume at the collector. Application in specialized medical X-ray systems is also possible.

SUMMARY OF THE INVENTION

Accordingly, it is an object of the invention to provide a high resolution X-ray collimator/detector system having reduced sensitivity to leakage radiation.

It is another object of the invention to improve the effectiveness of the collimator in such a system.

Briefly stated. and in accordance with an overall aspect of the invention, it is recognized that the collection volume of each detector element can be reduced to the actual volume occupied by the negative ion cloud resulting from an incident X-ray beam for optimum response to desired radiation while minimizing response to leakage radiation by a combination of reducing the width of the collector electrodes with wider spaces in between the collector electrodes, and providing metallized guard electrodes between the collector electrodes. Merely reducing the width of the collector electrodes does not achieve the desired result because narrow collector electrodes cause severe electric field distortions within the detector and adversely effect the response characteristics of the detector. The guard electrodes of the present invention serve to collect electrons freed by ionization between the collector electrodes resulting from "noise" X-rays, preventing these particular electrons from building up a space charge, or from reaching the actual collector electrodes. In addition, electric field distortions are minimized, with a consequent avoidance of adverse effects on detector response characteristics.

More particularly, a high resolution X-ray collimator/detector system in accordance with the invention includes a collimator having a plurality of narrow slits to limit and define the width of X-ray beams passing through the slits to thereby define system resolution. Immediately adjacent the collimator is a multi-element ionization chamber X-ray detector positioned such that X-ray beams passing through the collimator slits are incident on corresponding detector elements. The overall detector elements are wider than the X-ray beams.

The detector itself comprises a sealed housing with an X-ray permeable window containing a medium, such as pressurized xenon gas, to convert incident X-rays into charged particles. Within the housing is an array of spaced coplanar collector electrodes, preferably formed on a printed circuit board. Also within the housing are a plurality of voltage electrode portions parallel to and spaced from the collector electrodes such that electric fields can be established between the collector electrodes and the voltage electrode portions. Preferably, the voltage electrode portions comprise an uninterrupted voltage electrode plate, and the voltage electrode portions may be viewed as zones of the plate. As a result, an active collection volume of a corresponding detector element is defined generally between each collector electrode and a corresponding voltage electrode portion. The area of each collector electrode determines the extent of the corresponding active collection volume.

The collector electrodes have widths at least approaching an ideal minimum width for collection efficiency commensurate with beam width and alignment tolerances. As employed herein, the phrase "at least approaching" is intended to be interpreted broadly, as it will be understood and appreciated that the benefits of the invention can be achieved in part by designing a less-than-optimum structure which nevertheless is an improvement over the prior art. Positioned between and substantially coplanar with the collector electrodes are guard electrode portions which are electrically insulated from the collector electrodes but are held at substantially the same electrical potential as the collector electrodes, for example ground potential, so as to reduce sensitivity to leakage X-ray radiation not passing through the slits and to minimize electric field distortion.

BRIEF DESCRIPTION OF THE DRAWINGS

While the novel features of the invention are pointed out with particularity in the appended claims, the invention, both as to organization and content, will be better understood and appreciated from the following detailed description, taken in conjunction with the accompanying drawings, in which:

DETAILED DESCRIPTION

Figure 1A:
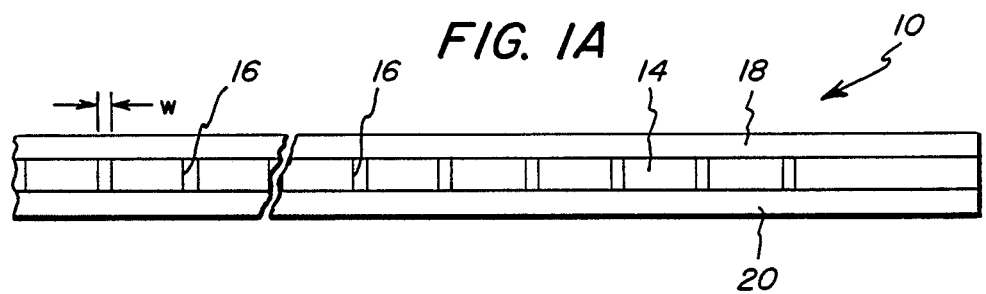
FIG. 1A is a fragmentary top view of a collimator having an exemplary construction like that disclosed in the above-identified application Ser. No. 875,021, now U.S. Pat. No. 4,638,499.
Figure 1B:
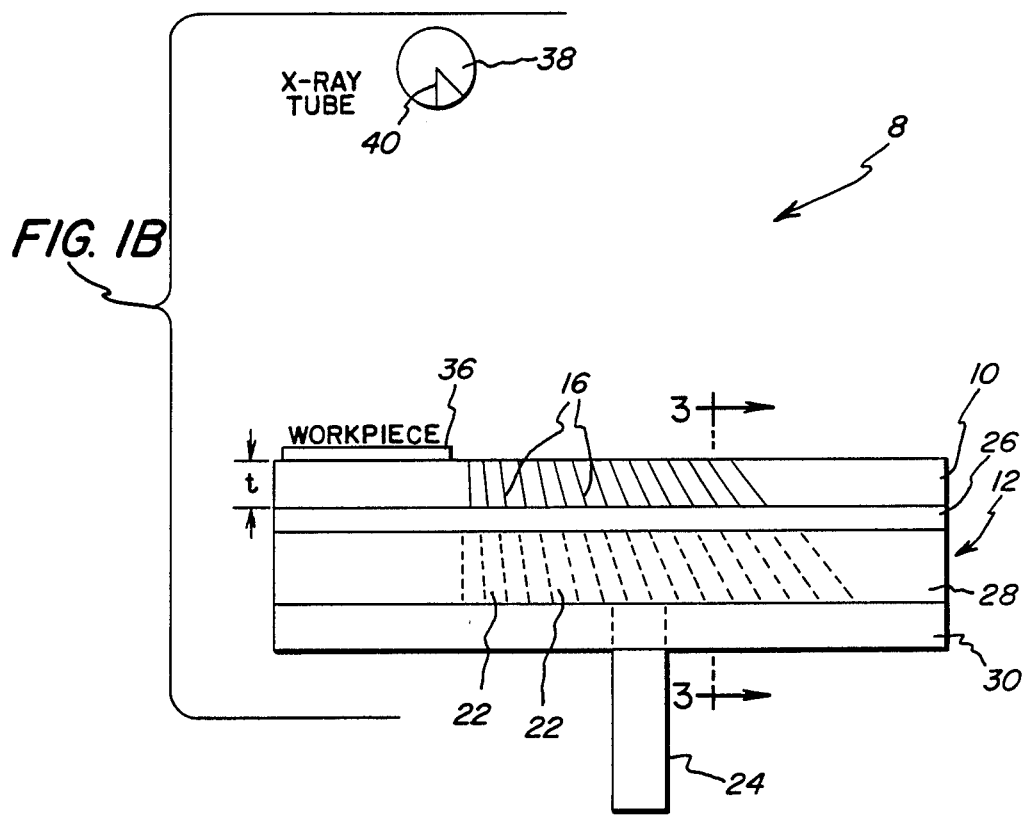
FIG. 1B is a simplified system diagram, taken from a side elevation, of an industrial X-ray scanner and collimator/detector.

Referring first to FIGS. 1A and 1B, a collimator/detector system 8 (FIG. 1B) includes a collimator 10 mounted to an immediately adjacent multi-element ionization chamber X-ray detector 12. The collimator 10 is of sandwich construction and includes a middle layer 14 having tapered slots 16 defining collimator slits sandwiched between side plates 18 and 20. The width w at the top of each tapered slit 16 is typically 0.003 inches, and 0.013 inches at the bottom. Slit length between the side plates 18 and 20 (corresponding to CT system slice thickness) is 0.1 inch. The thickness t of the collimator 10 is typically 0.9 inch. The collimator, including the slitted middle layer 14 and the side plates 18 and 20 is made of a material having high X-ray attenuation characteristics, such as tungsten. A suitable technique, employing Electric Discharge Machining (EDM) for fabricating such narrow, tapered collimator slits 16 is disclosed in the above-identified commonly assigned application Ser. No. 875,021, now U.S. Pat. No. 4,638,499.

The multi-element ionization chamber X-ray detector 12 generally comprises a plurality of detector elements 22 considerably wider than the collimator slits 16 and thus wider than X-ray beams passing through the slits 16 and incident on the detector elements 22. The detector elements 22 are generally defined by electrode regions carried by a T-shaped detector board 24, such as is described hereinbelow with reference to FIG. 2 (prior art) and FIG. 5 (an embodiment of the present invention). The detector 12 comprises a sealed housing having top 26, middle 28 and bottom 30 sections, as will be better seen in FIG. 3 discussed hereinbelow.

The particular geometry of FIG. 1B is employed in an X-ray CT inspection apparatus to provide internal images of long, narrow parts. Conventional circular CT geometry is inappropriate for such parts because X-rays cannot penetrate long lengths of metal and because the large separation required between source and detector causes loss in signal level, as well as alignment difficulties.

As depicted in FIG. 1B, an exemplary workpiece 36 to be inspected is placed on top of the collimator 10, and is scanned across the collimator while being illuminated by X-rays from an an X-ray tube 38 emitting a 40° fan beam as represented by the symbol 40. The collimator slits 16 and the detector elements 22 are radially aligned with reference to the X-ray tube 38, and the geometry is such that there are equal angular distances between adjacent slits 16 and between adjacent detector elements 22.

Figure 2:
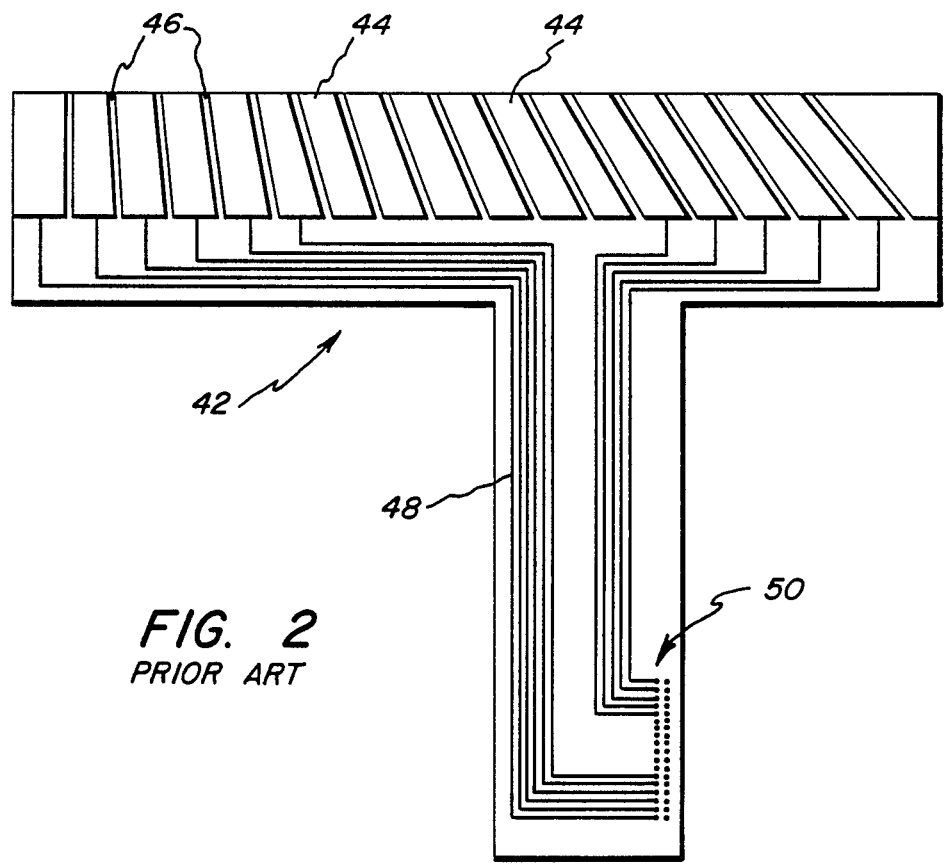
FIG. 2 depicts a prior art detector board such as may be employed in the detector portion of the FIG. 1B system, and is based on FIG. 6 of the above-identified application Ser. No. 875,021, now U.S. Pat. No. 4,638,499.

FIG. 2 more particularly depicts a prior art form of printed circuit detector board 42 comprising an array of collector electrodes 44 which can be employed as the detector board 24 in the overall structure depicted in FIG. 1B. The printed circuit detector board 42 of FIG. 2 corresponds to FIG. 6 of the above-identified application Ser. No. 875,021, now U.S. Pat. No. 4,638,499. The collector electrodes are in the form of wide metal strips 44 separated by narrow (e.g. 0.020 inch) insulating regions 46. The collector electrodes 44 are inclined at progressively increasing angles and aimed at the X-ray source 38. Typically, the overall width is eight inches, the height of the collector electrodes 44 is 1.1 inches, and their width approximately 0.4 inches. The actual width of each individual collector electrode 44 is determined by straightforward geometrical calculation such that each collector electrode 44 spans the same angular distance with reference to the FIG. 1B X-ray tube 38. Thus, the collector electrodes 44 are each slightly wider at the bottom than the top, and the collector electrodes 44 to the right are wider than the ones to the left. Printed circuit conductors 48 bring out the signals from the collector electrodes 44 to a suitable connector depicted at 50.

Figure 3:
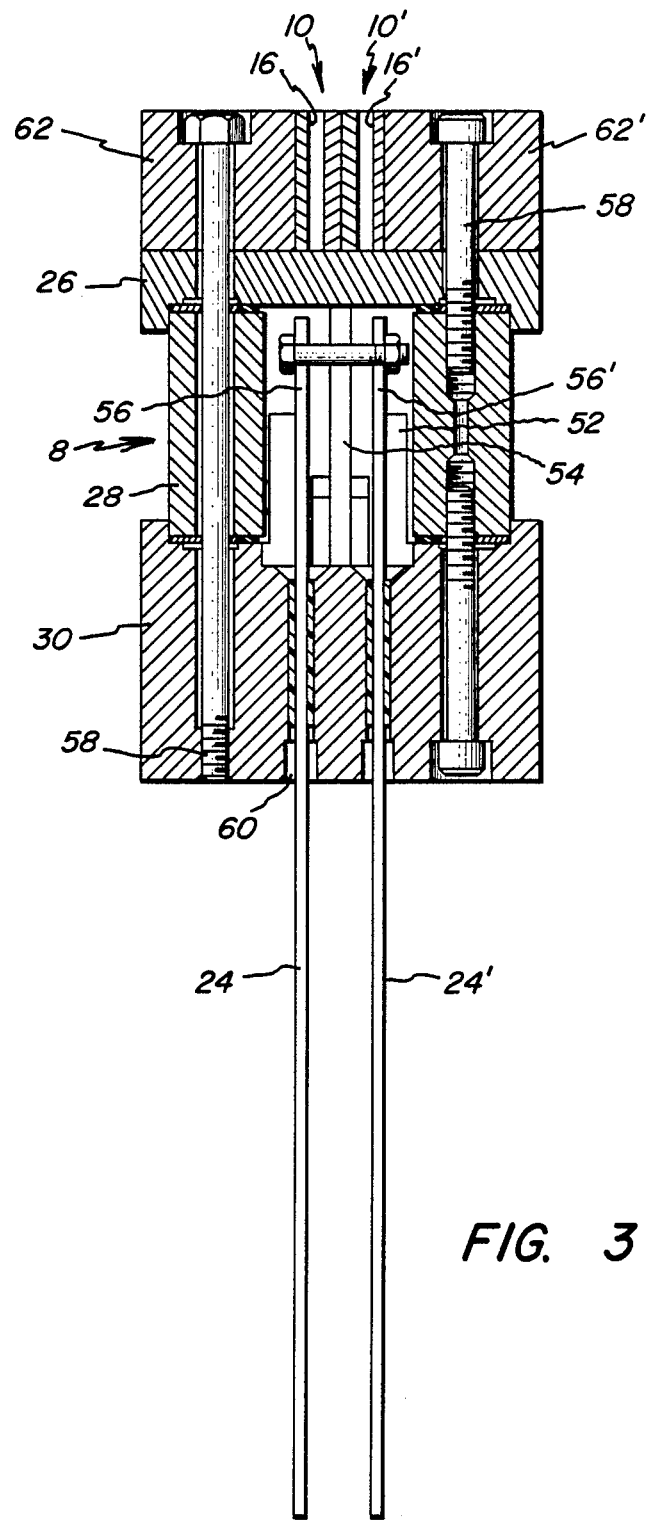
FIG. 3 is a cross-sectional view, taken generally along line 3—3 of FIG. 1B, of a typical construction having two detector boards in a single pressurized housing with a collimator mounted on top.

FIG. 3 is a cross-sectional view, taken generally along line 3—3 of FIG. 1B, including assembly details of the collimator-detector system 8. The collimator-detector 8 of FIG. 3 actually comprises two detector boards 24 and 24'. In FIG. 3, a central chamber 52 contains a long, continuous high voltage plate 54 and, on either side, parallel collector electrodes 56 and 56'. The voltage plate 54 is connected to a source of electrical potential, typically −5000 volts. The collector electrodes 56 and 56' are held, as a matter of convenience, near ground potential, but it will be understood that they are connected to suitable electronics.

The chamber 52 is filled with a suitable medium, such as xenon gas at a pressure of 75 atmospheres. O-rings and retaining washers are provided between the top, middle and bottom housing sections 26, 28 and 30, which are fastened together by machine screws 58. The conductor-carrying portions of the detector boards 24 and 24' pass through slots in the bottom housing section 30, and are sealed and retained by epoxy seals 60.

The top housing section 26 serves as a window and comprises aluminum, a material relatively transparent to X-rays, or the section 26 may be steel with a separate aluminum window. A pair of collimator assemblies 10 and 10' having respective slits 16 and 16' are mounted directly on top of the detector housing, between respective backing plates 62 and 62', which are secured to the detector housing by the machine screws 58. Thus, incident X-ray beams pass through the collimator slits 16 and 16', enter the detector 12 through the window 26, and pass between the electrodes 54 and 56 parallel to the electrodes, which are perpendicular to the window 26.

Figure 4:
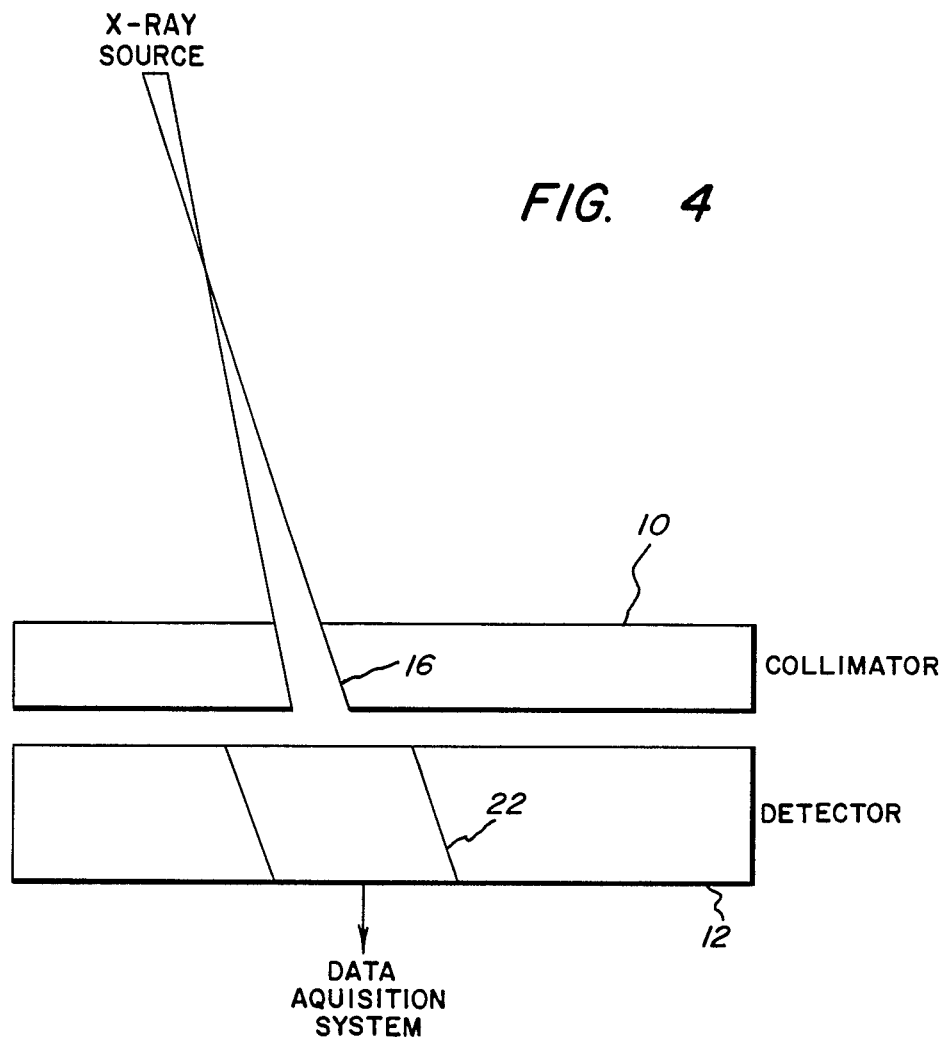
FIG. 4 is a diagram depicting the geometry of a single collimator slit and detector element.

FIG. 4 depicts the geometry of a typical one of the FIG. 1B detector elements. As noted hereinabove, the narrowed, tapered collimator slit 16 defines the system resolution, and the detector element 22 below is substantially wider. With the typical collector electrode configuration as depicted in FIG. 2, the detector is quite susceptible to leakage radiation, simply because the total collector volume is substantially larger than the primary beam volume. The noise susceptibility S of the detector element can be defined as $$S = \frac{\text{Total Collection Volume}}{\text{Primary Beam Collection Volume}}$$

For the electrode structure of FIG. 2, assuming the primary beam width is the same as the separation between the high voltage plate and the collector electrodes, this ratio can be approximated by (all dimensions are inches):

$$S = \frac{\frac{1}{2}(0.449 + 0.394)(\text{Height})(\text{Thickness})}{\frac{1}{2}(0.033 + 0.016)(\text{Height})(\text{Thickness})}$$

In the above equation, the term $\frac{1}{2}(0.449+0.394)$ is the average width of a collector electrode, and the term $\frac{1}{2}(0.033+0.016)$ is the average width of the X-ray beam after passing through the collimator.

Thus, with that particular configuration, the detector element 22 is approximately seventeen times more susceptible to noise than to primary signal. Proper shielding outside the detector housing can eliminate most leakage radiation, but the sensitivity to that which remains is quite severe.

Figure 5:
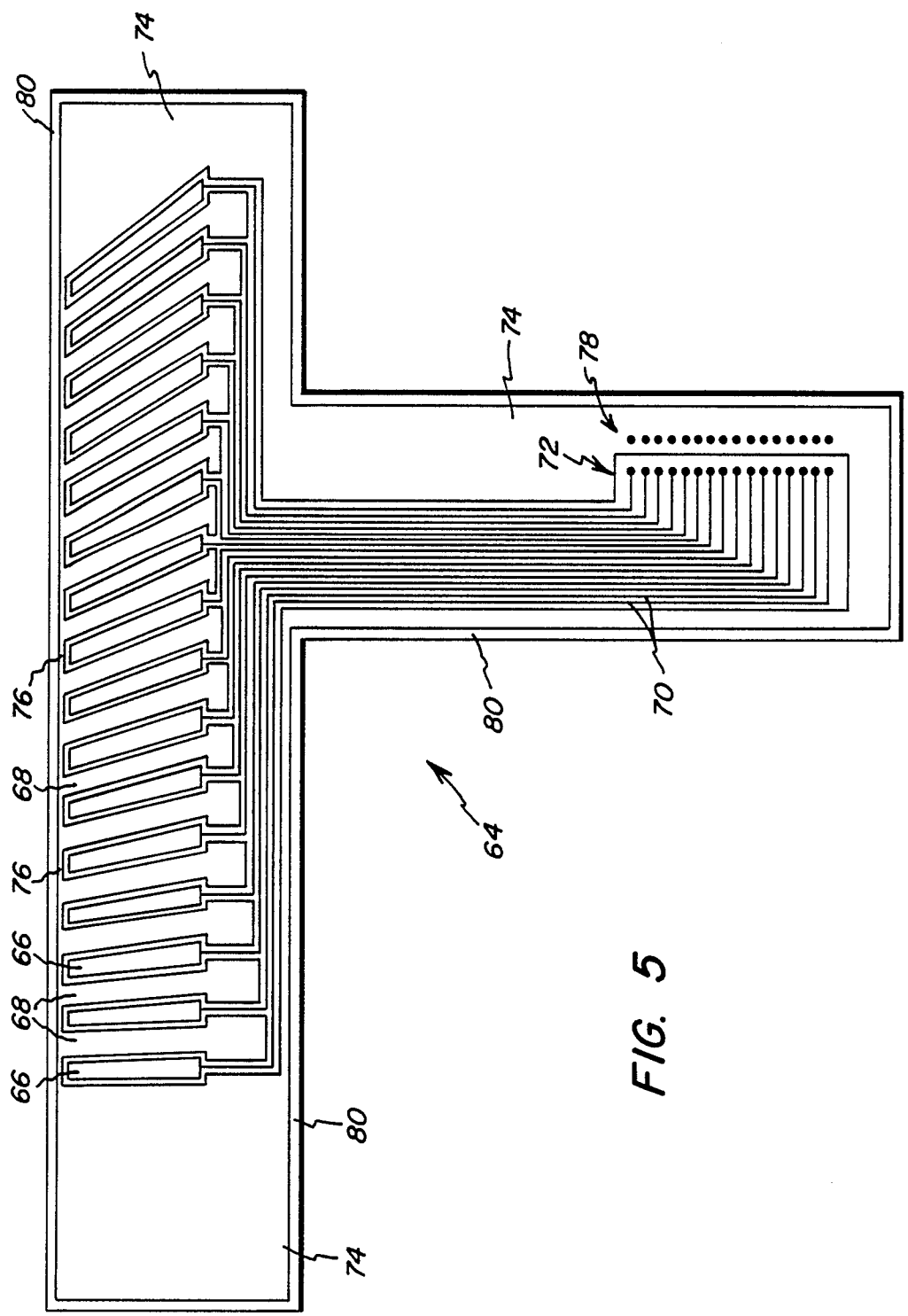
FIG. 5 depicts a detector board in accordance with the present invention including collector electrodes and intermediate guard electrode portions.

FIG. 5 depicts a detector board 64 in accordance with the invention. It will be appreciated that the FIG. 5 detector board 64 can be employed as the detector board 24 in the configuration of FIGS. 1B and 3.

In FIG. 5, collector electrodes 66 are substantially reduced in width compared to the FIG. 2 electrodes 44, and have guard electrode portions 68 positioned between. The collector electrodes 66 are connected via individual printed circuit board conductors 70 to a row of suitable connector pins 72.

The guard electrode portions 68 comprise portions of what may be viewed as a single ground plane 74, with the portions 68 between the collector electrodes 66 connected by printed circuit conductors 76 above the collector electrodes 66. Another row of connector pins 78 facilitates electrical connection to the ground plane 74. In accordance with conventional printed circuit board layout techniques, there is an insulating border 80 around the periphery of the ground plane extending to the edges of the board 64. This particular layout minimizes stray capacitance which would otherwise be introduced by running ground leads out between the active signal leads, and it also reduces the board area inside the xenon pressure chamber 52 by reducing the area for printed circuit conductors below the collector electrodes 66.

The minimum width required for each collector electrode 66 is easily calculated from system geometry, and it will be appreciated that the precise sizing of the relative width is a matter of routine design and optimization. The design depicted in FIG. 5 as a matter of convenience simply partitions the area for guard electrode portions 68 and the area for collection electrodes 66 equally in order to minimize the difficulty in aligning the collimator slits 16 with the active collection areas. It is believed that the ultimate limit will be determined by collimator fabrication difficulties, which are expected to limit the reduction in Total Collection Volume to approximately two times the Primary Beam Collection volume. Again, as stated above, in accordance with the invention, the collector electrodes have widths at least approaching an ideal minimum width for collection efficiency commensurate with beam width and alignment tolerances, and this is intended to be interpreted broadly to encompass less-than-optimum structures wherein the benefits of the invention are achieved in part and which nevertheless are improved over the prior art.

In view of the foregoing, it will be appreciated that the present invention provides an improved collimator/detector system for high resolution X-ray systems, and is particularly applicable to industrial Computerized Tomography. The combination of narrower collector electrodes and intermediate guard electrode portions serves to significantly reduce sensitivity to leakage radiation, and substantially confines detector sensitivity to the primary beam collection volume. The guard electrodes 68 serve to reduce spurious background signals by collecting and shunting to ground electrons resulting from leakage X-ray radiation. Thus, in addition to minimizing electric field distortion, the guard electrodes 68 make the collimator more effective. As a side effect, the guard electrodes 68 minimize cross-talk between adjacent detector elements by providing increased physical and electrical separation.

While specific embodiments of the invention have been illustrated and described herein, it is realized that qualifications and changes will concur to those skilled in the art. it is therefore to be understood that the appended claims are intended to cover all such modifications and changes as fall within the true spirit and scope of the invention.

What is claimed is:

1. A high resolution X-ray collimator/detector system having reduced sensitivity to leakage radiation, said system comprising:
   a collimator having a plurality of narrow tapered slits to limit and define the widths of X-ray beams passing through said slits, thus defining system resolution; and
   a multi-element ionization chamber X-ray detector immediately adjacent said collimator such that X-ray beam are incident on corresponding detector elements, the detector elements being wider than the X-ray beams, and said detector comprising:
   a sealed housing with an X-ray permeable window and containing a medium to convert incident X-rays into charged particles;
   an array of spaced coplanar collector electrodes within said sealed housing which are held at an electric potential;
   a plurality of voltage electrode portions within said sealed housing parallel to and spaced from said collector electrodes such that electric fields can be established between said collector electrodes and said voltage electrode portions, an active collection volume of a corresponding detector element being defined generally between each collector electrode and a corresponding voltage electrode portion, with the area of each collector electrode determining the extent of the corresponding active collection volume; and
   guard electrode portions positioned between and substantially coplanar with said collector electrodes, said guard electrode portions being electrically insulated from and at least as wide as said collector electrodes and held at substantially the same electrical potential as said collector electrodes so as to reduce sensitivity to leakage X-ray radiation not passing through the slits and to minimize electric field distortion.

2. A system in accordance with claim 1, wherein said collector electrodes and said guard electrode portions are perpendicular to said window and parallel to incident X-ray beams.

3. A system in accordance with claim 2, wherein said collector electrodes and said guard electrode portions are formed on a printed circuit board.

4. A system in accordance with claim 1, wherein said colloctor electrodes and said guard electrode portions are formed on a printed circuit board.

5. A system in accordance with claim 1, wherein said voltage electrode portions comprise an uninterrupted voltage electrode plate.

6. A multi-element ionization chamber X-ray detector for use in combination with an immediately adjacent collimator having a plurality of narrow slits to limit and define the widths of X-ray beams passing through said slits to thus define system resolution, said detector comprising:
   a plurality of detector elements corresponding to the slits of the collimator and positionable such that X-ray beams passing through the slits are incident on said detector elements, said detector elements being wider than the X-ray beams;
   a sealed housing with an X-ray permeable window and containing a medium to convert incident X-rays into charged particles;
   an array of spaced coplanar collector electrodes within said sealed housing which are held at an electric potential;
   a plurality of voltage electrode portions within said sealed housing parallel to and spaced from said collector electrodes such that electric fields can be established between said collector electrodes and said voltage electrode portions, an active collection volume of a corresponding detector element being defined generally between each collector electrode and a corresponding voltage electrode portion, with the area of each collector electrode determining the extent of the corresponding active collection volume; and
   guard electrode portions positioned between and substantially coplanar with said collector electrodes, said guard electrode portions being electrically insulated from and at least as wide as said collector electrodes and held at substantially the same electrical potential as said collector electrodes so as to reduce sensitivity to leakage X-ray radiation not passing through the slits and to minimize electric field distortion.

7. An X-ray detector in accordance with claim 6, wherein said collector electrodes and said guard electrode portions are perpendicular to said wndow and parallel to incident X-ray beams.

8. An X-ray detector in accordance with claim 7, wherein said collector electrodes and said guard electrode portions are formed on a printed circuit board.

9. An X-ray detector in accordance with claim 6, wherein said collector electrodes and said guard electrode portions are formed on a printed circuit board.

10. An X-ray detector in accordance with claim 6, wherein said voltage electrodes portions comprise an uninterrupted voltage electrode plate.

* * * * *